US010449940B2

(12) United States Patent
Cadeddu

(10) Patent No.: US 10,449,940 B2
(45) Date of Patent: Oct. 22, 2019

(54) PRE-FILLING DEVICE FOR A BRAKING SYSTEM COMPRISING A HYDRO-BOOSTER DEVICE AND OPERATING METHOD THEREOF

(71) Applicant: VHIT S.p.A., Offanengo (IT)

(72) Inventor: Leonardo Cadeddu, Crema (IT)

(73) Assignee: VHIT S.P.A., Offanengo (IT)

( * ) Notice: Subject to any disclaimer, the term of this patent is extended or adjusted under 35 U.S.C. 154(b) by 58 days.

(21) Appl. No.: 15/754,432

(22) PCT Filed: Sep. 2, 2016

(86) PCT No.: PCT/IB2016/055265
§ 371 (c)(1),
(2) Date: Feb. 22, 2018

(87) PCT Pub. No.: WO2017/037666
PCT Pub. Date: Mar. 9, 2017

(65) Prior Publication Data
US 2019/0023245 A1   Jan. 24, 2019

(30) Foreign Application Priority Data
Sep. 4, 2015   (IT) .................. 102015000048535

(51) Int. Cl.
*B60T 13/14*   (2006.01)
*B60T 7/12*   (2006.01)
(Continued)

(52) U.S. Cl.
CPC .............. *B60T 13/145* (2013.01); *B60T 7/12* (2013.01); *B60T 13/14* (2013.01); *B60T 13/24* (2013.01);
(Continued)

(58) Field of Classification Search
CPC ............................ B60T 13/145; B60T 17/223
See application file for complete search history.

(56) References Cited

U.S. PATENT DOCUMENTS 3,327,590 A * 6/1967 Johnson .................. F15B 17/00
91/370
4,014,171 A * 3/1977 Kobashi .................. B60T 13/12
60/547.3
(Continued)

FOREIGN PATENT DOCUMENTS

DE   1576087 A1   7/1969
EP   0290785 A1   11/1988
(Continued)

OTHER PUBLICATIONS

International Search Report dated Dec. 2, 2016, of the corresponding International Application PCT/IB2016/055265 filed Sep. 2, 2016.

*Primary Examiner* — Thomas E Lazo
(74) *Attorney, Agent, or Firm* — Norton Rose Fulbright US LLP; Gerard Messina

(57) ABSTRACT

A pre-filling device for a braking system. The pre-filling device includes a pre-filling channel, a pre-filling pressure being inside the channel when the braking system is in a rest and hydro-boost position, and a mechanical valve configured to be opened following a transition from the rest and hydro-boost position to a working position of the braking system; and a hydraulic valve cooperating with the mechanical valve setting the pre-filling pressure inside the channel. The hydraulic valve includes in a first area, facing the mechanical valve, a hole communicating with the channel, and in a second area, hydraulically isolated from the first area, a preloaded resilient element in a chamber held at atmospheric pressure. The hydraulic valve is configured to be connected or not to be connected, by a reciprocating (Continued)

movement inside the channel, to a hydro-booster device and to keep a predetermined pre-filling pressure upon varying of the hydro-boost pressure.

9 Claims, 3 Drawing Sheets

(51) Int. Cl.
    *B60T 13/24*     (2006.01)
    *B60T 13/38*     (2006.01)
    *B60T 15/38*     (2006.01)
    *B60T 15/42*     (2006.01)
    *B60T 17/04*     (2006.01)
    *B60T 17/22*     (2006.01)
    *F15B 7/08*     (2006.01)
    *F16K 31/122*     (2006.01)

(52) U.S. Cl.
    CPC .............. *B60T 13/38* (2013.01); *B60T 15/38* (2013.01); *B60T 15/42* (2013.01); *B60T 17/04* (2013.01); *B60T 17/223* (2013.01); *F15B 7/08* (2013.01); *F16K 31/122* (2013.01); *B60T 2201/12* (2013.01); *B60T 2201/122* (2013.01)

(56) References Cited

U.S. PATENT DOCUMENTS

| | | | | |
|---|---|---|---|---|
| 4,179,980 | A | | 12/1979 | Kito et al. |
| 4,337,686 | A | * | 7/1982 | Ohta ..................... B60T 13/144 60/547.3 |
| 4,860,636 | A | * | 8/1989 | Bertling ................ B60T 13/144 91/376 R |
| 4,860,637 | A | * | 8/1989 | Schmitt ................ B60T 13/144 91/376 R |
| 5,179,980 | A | | 1/1993 | Hubner et al. |
| 7,127,891 | B2 | * | 10/2006 | Ohlig ..................... B60T 8/4077 60/547.1 |
| 2004/0212248 | A1 | * | 10/2004 | Cadeddu ............... B60T 13/145 303/114.1 |

FOREIGN PATENT DOCUMENTS

| | | |
|---|---|---|
| EP | 0290786 A1 | 11/1988 |
| EP | 1457400 A1 | 9/2004 |
| EP | 2412593 A1 | 2/2012 |

* cited by examiner

PRE-FILLING DEVICE FOR A BRAKING SYSTEM COMPRISING A HYDRO-BOOSTER DEVICE AND OPERATING METHOD THEREOF

FIELD

The present invention relates generally to a pre-filling device for a braking system having brakes with assisted or hydro-boosted braking, applicable to motor vehicles and in particular, though not exclusively, to agricultural vehicles.

More particularly, the present invention relates to a pre-filling device for braking systems having at least one master cylinder connected to the vehicle brakes and at least one source of hydraulic pressure, the pressure being preferably adapted to actuate a device for hydraulically boosted braking (hydro-booster) for assisting braking of the vehicle by providing a certain hydro-boost pressure.

BACKGROUND INFORMATION

European Patent Application No. EP1457400_A1 describes, inter alia, a pre-filling device configured to prepare braking in a braking system by supplying the brakes, through the master cylinder, prior to the actual braking, a pre-filling pressure having a predetermined value, usually a medium/low pressure value.

Conventionally, the value of the pre-filling pressure is a function of the hydro-boost pressure used by the hydro-booster, for example about 20-25 bar, and a delta pressure, for example 19 bar, obtained by a decrease in pressure from the hydro-boost pressure, the decrease being generated by a spring element which operates between a pair of balls provided in the pre-filling device.

For example, a variation of the pressure used by the hydro-booster will give:

20−19=1, or  a)

25−19=6,  b)

therefore a variation between 1 and 6 bar, while not considering any small tolerances of the delta pressure.

While appreciating that the conventional pre-filling device is, in general, very effective, it has been observed, in the course of experimental tests, that during use the hydro-boost pressure is not a constant value but, in particular in agricultural vehicles, it is a value that can be comprised, for example, between 20 and 25 Bar.

The variations observed, in some cases, assuming a constant counter-pressure generated by the spring element and acting on the pair of valves of the pre-filling device, prevent to ensure that the pre-filling pressure is maintained within very narrow margins, comprised, for example, between 3-4 Bar.

This fact implies, of course, that the braking of the vehicle can present different behaviors upon varying of the hydro-boost pressure and thus of the pre-filling pressure.

Hydro-boost devices (hydro-boosters) comprising mechanical valves are also available. For instance:

U.S. Pat. No. 4,337,686 A describes a hydro-booster comprising an input rod, a sliding piston, placed around the input rod and adapted to separate an oil inlet chamber from an oil outlet chamber, and a valve able to allow a predetermined minimum passage of oil between the two chambers;

European Patent Application No. EP2412593A1 describes a hydro-booster comprising a hydro-boost chamber, an input rod, a hydro-boost passageway between a reservoir and the hydro-boost chamber, and a gasket adapted to selectively isolate the hydro-boost passageway from the hydro-boost chamber depending on the position of the input rod;

European Patent Application Nos. EP0290785A1 and EP0290786A1 describe a hydro-booster comprising a valve which is arranged internally to a piston and is opened by actuating the brake pedal so that a pressurized fluid coming from a reservoir can act on the piston;

U.S. Pat. No. 4,179,980 A describes a hydro-booster comprising a primary piston, a control rod, a charaber located between the primary piston and the control rod and a control valve, actuated by the control rod, for controlling the fluid pressure in the chamber;

German Patent Application No. DE1576087A1 describes a hydro-booster comprising a piston, a control rod, communication ducts between a fluid inlet and the piston, and a valve for controlling a fluid flow through the communication ducts.

In summary, the related art does not provide teachings to keep the pressure of the pre-filling within very narrow margins, upon varying of the hydro-boost pressure, so as to ensure a high degree of uniformity in the pre-filling braking of the vehicle.

SUMMARY

An object of the present invention is a pre-filling device configured to adjust or limit variations of the pre-filling pressure in a pre-filling channel and thus solve the prior art problems highlighted above.

This object may be achieved by providing a pre-filling device for a braking system, having a hydro-boost device as described herein, adapted to generate a hydro-boost pressure.

The present invention further relates to a corresponding operating method of the device according to the present invention.

The following brief description of the present invention is given in order to provide a basic understanding of some aspects of the present invention.

This brief description is not an extended description and as such it should not be understood as being adapted to identify key or critical elements of the present invention nor to delineate the scope of the present invention. Its sole purpose is to present some features of the present invention in a simplified form as a preview to the detailed description below.

According to a feature of a preferred embodiment of the present invention, the pre-filling device comprises a mechanical valve and a hydraulic valve, wherein the hydraulic valve is configured to adjust the pre-filling pressure by means of a reciprocating movement inside the pre-filling channel upon varying of the pressure in the hydro-boosted braking system.

According to another feature of the present invention, the hydraulic valve includes a first area in connection with the pre-filling channel at the pre-filling pressure and a second area, isolated from the first, kept at atmospheric pressure.

According to a further feature of the present invention, in the first zone there is also provided a stop element suitable to act as an abutment element for the hydraulic valve when the first area is in connection with the assisted braking system.

BRIEF DESCRIPTION OF THE DRAWINGS

These and other features and advantages of the present invention will become apparent from the following description of a preferred embodiment given by way of non-limiting examples with the aid of the figures, in which components identified by the same reference numerals indicate components having a same or similar function and structure.

DETAILED DESCRIPTION OF EXAMPLE EMBODIMENTS

Figure 1A:
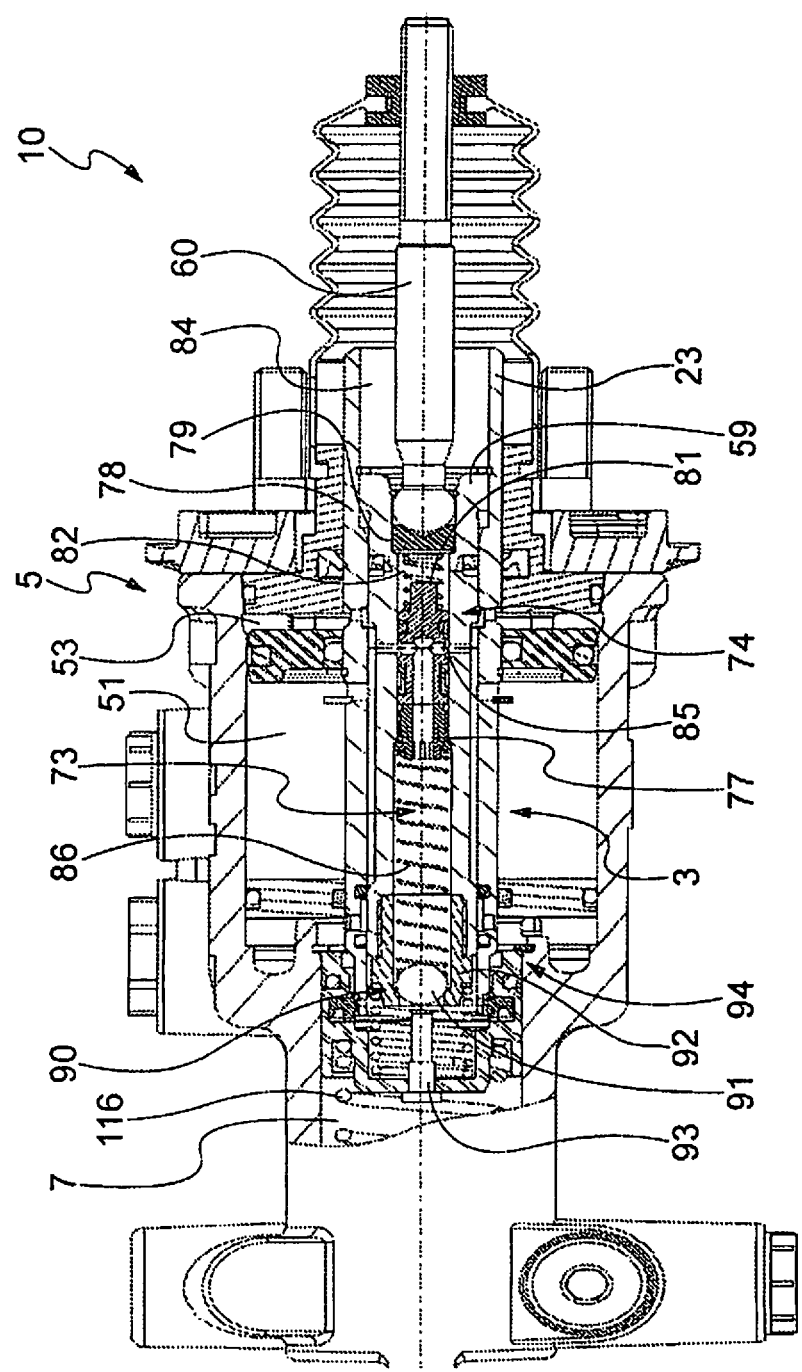
FIGS. 1a and 1b show a pre-filling device according to the present invention in a rest position and in the absence of hydro-boost pressure.
Figure 1B:
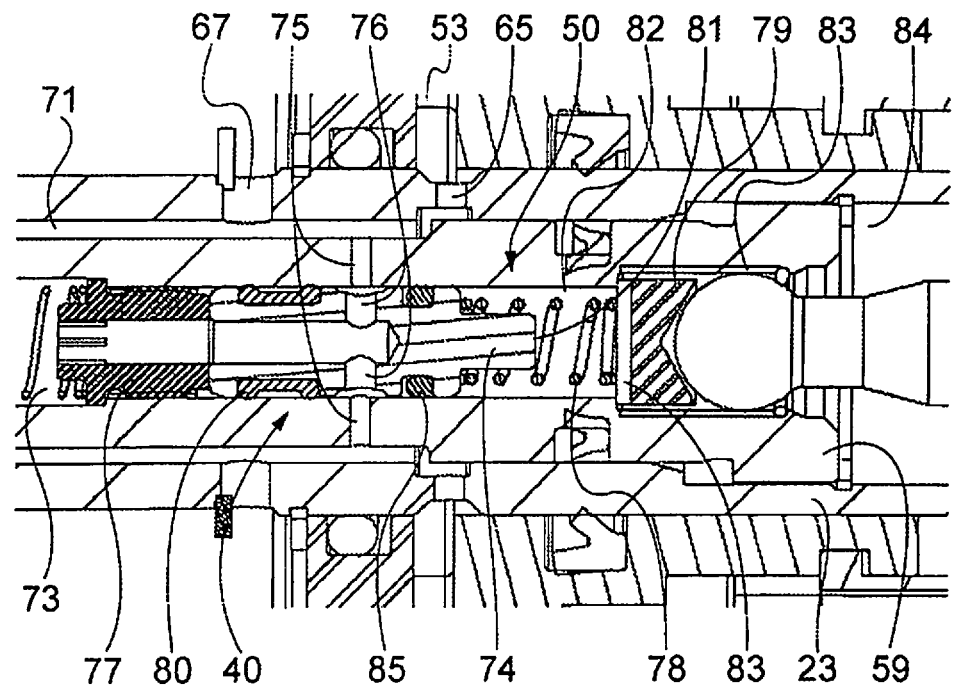
Figure 2B:
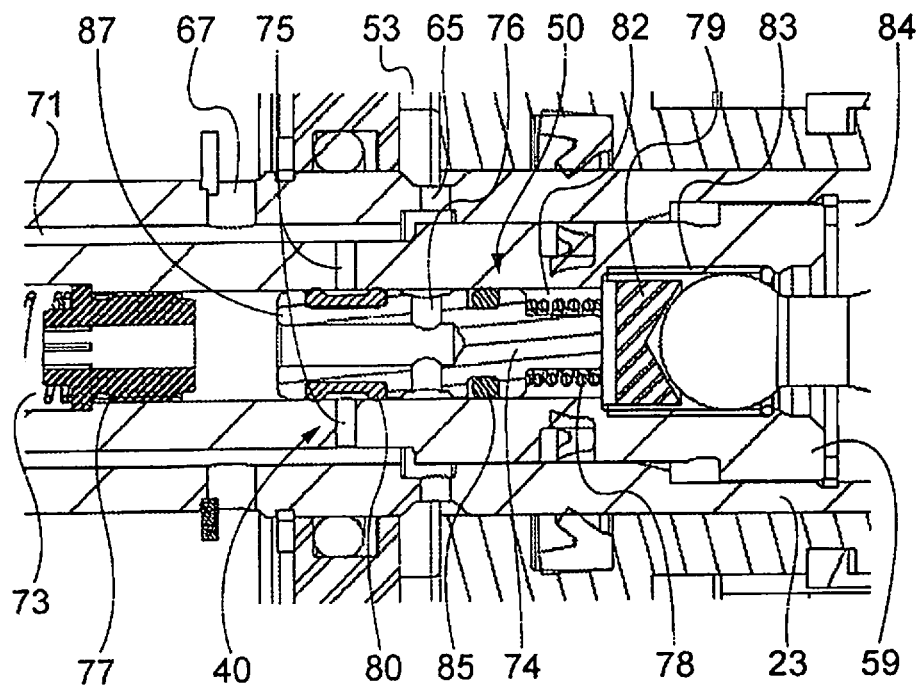
FIGS. 2a and 2b show the device of FIGS. 1a and 1b in a rest position but in the presence of hydro-boost pressure.
Figure 2A:
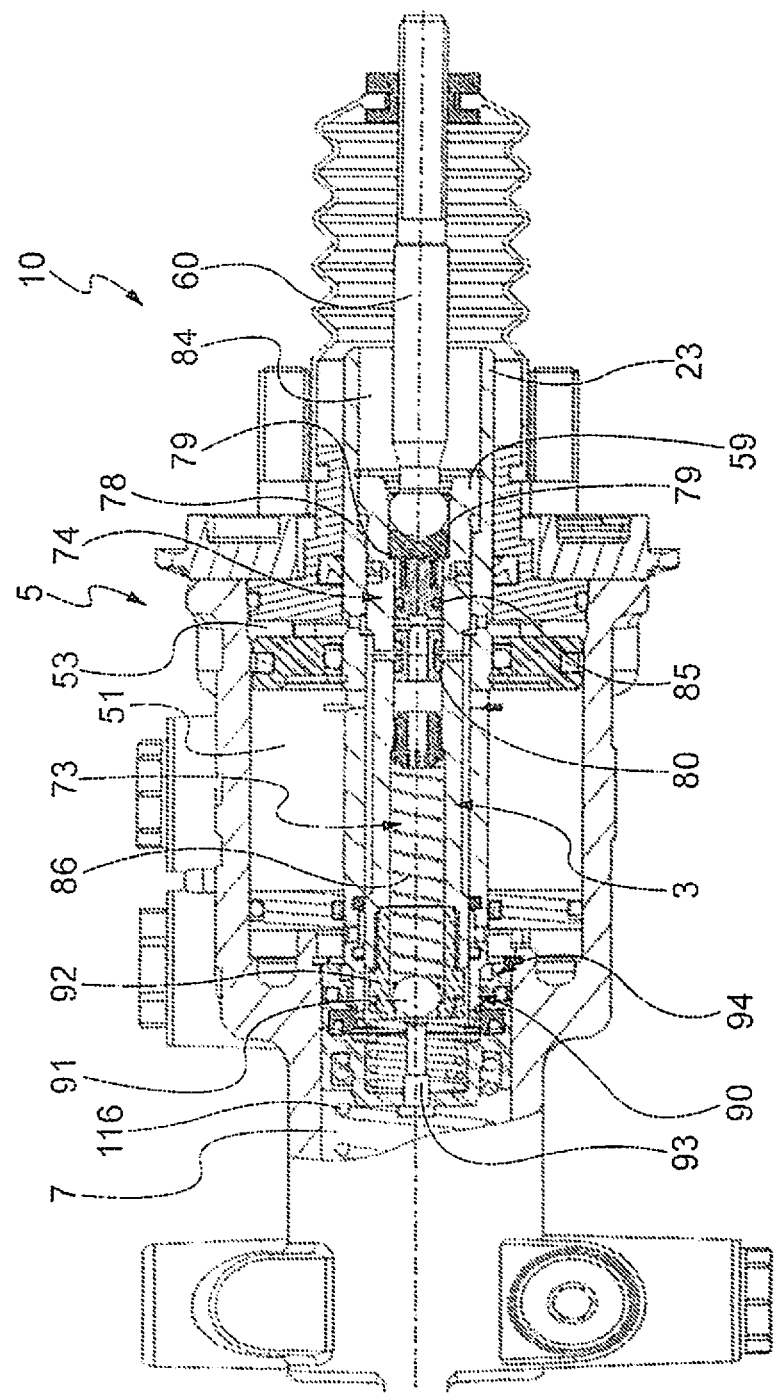

Referring to the FIGS. 1a, 1b and 2a, 2b, an area 10 of a braking system for controlling hydraulic brakes of a vehicle is shown both in a rest position in the absence of a hydro-boost pressure (FIGS. 1a e 1b) and in a rest position in the presence of a hydro-boost pressure (FIGS. 2a and 2b).

In the context of the present description the term "rest position" refers to a position of the system in which the brakes are not actuated, the term "in the absence of hydro-boost pressure" refers to a position in which the pressure source in the braking system is active and the term "in the presence of hydro-boost pressure" refers to one of the positions provided when the hydro-boost pressure is present.

As all the figures refer to the rest position of the braking system, this position is taken as a reference, unless otherwise stated, in the following description.

In the area 10, a hydro-boost device (hydro-booster) 5 and a pre-filling device 3 of a preferred embodiment of the present invention are shown.

Still in the area 10, the reference numeral 7 represents part of a chamber of a master cylinder in which a brake-controlling hydraulic piston (piston of the master cylinder) 94 and a spring 116, adapted to withdraw the hydraulic piston following braking, operate.

Still in the area 10, the reference numeral 60 represents a controlling rod adapted to control directly, in a conventional manner, a sliding bar 59 and indirectly, through the sliding bar 59, a plunger 23 for actuating braking of the vehicle by means of the hydraulic brakes.

According to the exemplary embodiment, a hydro-booster device 5 comprises a first chamber (rear chamber) 53 and a second chamber (front chamber) 51, the chambers, in the rest position, communicating with each other in a conventional manner through a first hole (rear hole) 65, a second hole (front hole) 67 and a channel 71, all of them being formed in the plunger 23.

It is to be noted that, for ease of description, in the present description the terms "front" and "rear" are used to indicate components shown on the left and on the right in the figures, respectively.

The pre-filling device 3, according to the preferred embodiment of the present invention, comprises a duct 73 which is provided inside the sliding bar 59 and in which a piston-valve (rear valve) 74 acting as hydraulic valve and a front valve 90 acting as mechanical valve are arranged.

The piston-valve or rear valve 74 of the pre-filling device 3 comprises a first area or front area 40 in which, for example, a radial hole (hole of the piston-valve) 76 is provided communicating both with the duct 73 and, in the rest position and in the absence of the hydro-boost pressure, with a radial hole 75 provided in the sliding bar 59 and communicating, in turn, with the annular chamber 71.

The piston-valve 74 further comprises a second area or rear area 50, isolated from the first area 40.

In the second area 50 there is provided, for example, a rear face 81 adapted to come into abutment, in the position in which the hydro-boost pressure is present, against an abutment element 79, for example a joint element of the Controlling rod 60.

In the first area 40 there is provided a front face 87 adapted to come into abutment, in the position in which the hydro-boost pressure is absent, against a stop element 77 provided in the sliding bar 59 and axially bored so as to communicate with the outlet duct.

In addition, the piston-valve 74 is in abutment, preferably in the rear area 50, against a front end of a pre-loaded resilient element 78, for instance a spring, housed in a chamber 82 isolated from the outlet duct 73 by means of a gasket 85 provided, preferably, for hydraulically isolating the first area 40 from the second area 50 of the piston-valve 74.

Preferably, the spring 78 has a rear end abutting, in all the illustrated positions, against the abutment element 79.

According to the present embodiment example, the spring 78 has the function of keeping the pre-filling pressure at limited values irrespective of the pressure of the hydro-booster 5.

According to the preferred embodiment, the abutment element 79 comprises passageway 83 configured to communicate the chamber 82 with a rear chamber 84 provided, for example, near the controlling rod 60 and held at atmospheric pressure, whereby also the chamber 82 is held at atmospheric pressure.

The front valve 90 comprises a seat 92 on which, in all the positions illustrated in the figures, a ball 91 is held in position on the seat 92 by a spring 86.

In use, the transition from the rest position to a working position, following an initial actuation of the controlling rod 60, entails that the valve 90 is opened by a stem 93 integral with the piston of the master cylinder 94.

According to the embodiment example described, the valve 90 is opened by the stem 93 upon the relative movement of the sliding bar 59 relative to the plunger 23, and of the initial stroke thereof towards the piston of the master cylinder 94 when passing from the rest position to the working position of the braking system.

The opening of the valve 90 allows the activation of the pre-filling function and the braking function, as described in European Patent Application No. EP1457400_A1, by communicating the outlet duct 73 with the chamber 7 of the master cylinder.

The operation of the system and, in particular, of the pre-filling device 3 described so far is as follows.

In the rest position and in the presence of the hydro-boost pressure, the hydro-boost pressure in the chambers 53 and 51, connected to each other through the radial holes 65 and 67 drilled in the plunger 23, has fed, via the annular chamber 71, through the radial holes 75 and 76, the central duct 73, where the pre-filling device 3 operates. In the rest position, the front valve 90 is closed, and therefore the fluid from the annular chamber 71 raises in pressure, thus exerting a hydraulic thrust onto the piston-valve 74 until it overcomes the load of the spring 78, arranged in the chamber 82, in which atmospheric pressure is present.

Indeed, the chamber 82 is connected, through the passageways 83 provided in the abutment element 79, to the chamber 84, at atmospheric pressure, and is separated from the central channel 73 by means of the gasket 85.

Once the so-called "pre-filling" pressure is reached, the piston-valve 74 causes closing of the holes 75 formed in the sliding bar by intercepting them with a gasket 80 provided, for example, in the first area 40 of the piston-valve 74.

The pre-filling device 3 remains in this position, with the rear face 81 of the piston-valve 74 in abutment against the abutment element 79 until the pressure in the central channel 73 becomes equal to or higher than the pre-filling pressure.

During operation, when the pressure in the pre-filling channel 73 decreases, the piston-valve 74 returns towards the stop element 77, thus reconnecting, in a "modulated" manner through the holes 75 and the annular chamber 71, the chambers 53 and 51 of the hydro-boost pressure with the outlet duct or pre-filling channel 73, while keeping substantially constant the pressure in the pre-filling channel, through a continuous "opening/closing" or reciprocating movement (modulation) of the piston-valve 74 in the pre-filling channel 73 in cooperation with the gasket 80.

By virtue of the continuous opening/closing of the connection of the pre-filling channel 73 with the chambers 53 and 51 of the hydro-booster 5 (micrometric pulsed modulation of the piston-valve 74 and of the gasket 80 relative to the holes 75), the pressure inside the channel 73 will be kept substantially constant and dependent on the dynamically obtained difference between the pressure values generated by the preferably pre-loaded spring 78 with reference to the atmospheric pressure.

Thanks to the configuration, as exemplified, of the piston-valve 74, the pressure inside the pre-filling channel 73 will not be influenced by pressure variations of the hydro-booster device 5 and, therefore, the piston-valve 74 will operate as a control valve or relief valve for the pre-filling pressure.

For example, regardless of the hydro-boost pressure, assuming that the pre-filling spring is preloaded to be overcome by a pressure higher by 3-4 bar with respect to the atmospheric pressure, the piston-valve 74 will cause closing of the holes 75, thanks to the intervention of the gasket 80, thus ensuring a substantially constant pre-filling pressure independent of the hydro-boost pressure.

In the course of braking the piston-valve or relief valve 74 will remain constantly closed until, upon decrease of the braking pressure, once the value of the pre-filling pressure is reached, the relief valve 74 will return to an initially balanced position, not shown, and will subsequently oscillate between the position shown in FIGS. 1a and 1b and that shown in FIGS. 2a and 2b, as a result of the reciprocating movement of continuous opening/closing (modulation) performed by the relief valve 74.

The pressure in the channel 73 will return to the pre-filling pressure values when, upon return of the piston 94 towards the rest position, the ball 91 leaves the stem 93 thus closing the valve 90.

In summary, the pre-filling pressure values and the operation of the pre-filling device 3 and, in particular, of the piston-valve 74 will not be influenced by variations of the hydro-boost pressure of the hydro-booster, at least until the hydro-boost pressure becomes less than or equal to the pressure set by the pre-filling spring 78.

The pre-filling device according to the present invention, in addition to ensuring high uniformity of the pre-filling braking, also allows reducing the amount of pressurized fluid used for braking, with consequent energy saving and reduction of pollutant emissions from the vehicle.

Of course, changes and/or variations are possible to the above description, in dimensions, shapes, materials, components and connections, as well as in the details of the illustrated construction and of the method of operation without departing from the scope of the present invention.

The invention claimed is:

1. A pre-filling device configured to operate in a braking system, the braking device including a hydro-booster device arranged to generate a hydro-boost pressure, and a master cylinder chamber having a hydraulic piston for brake control, the pre-filling device comprising:
   a pre-filling channel, a pre-filling pressure being provided inside the pre-filling channel when the braking system is in a rest and hydro-boost position;
   a mechanical valve configured to be mechanically opened following a transition from the rest and hydro-boost position to a working position of the braking system, and to connect the pre-filling channel to the master cylinder chamber;
   a hydraulic valve configured to cooperate with the mechanical valve for setting the pre-filling pressure inside the pre-filling channel, the hydraulic valve including, in a first area facing the mechanical valve, a hole communicating with the pre-filling channel, and in a second area, hydraulically isolated from said first area and opposite to said first area, a preloaded resilient element housed in a chamber held at atmospheric pressure, the hydraulic valve being configured to be connected, through the hole, to the hydro-booster device, or to be disconnected therefrom, by a reciprocating movement inside the pre-filling channel, so as to effect adjustment of said pre-filling pressure inside the pre-filling channel upon variation of the hydro-boost pressure, the adjustment depending on a difference between a pressure exerted by the preloaded resilient element and the atmospheric pressure.

2. The device according to claim 1, wherein the preloaded resilient element is a spring comprising a first end abutting, inside said second area, against the hydraulic valve, and a second end arranged to lie against a rod joint element of the braking system.

3. The device according to claim 1, wherein the first area and said second area of the hydraulic valve are hydraulically separated by a gasket secured to the hydraulic valve and arranged to hydraulically separate the pre-filling channel from the chamber held at atmospheric pressure.

4. A device according to claim 1, wherein the hydraulic valve comprises, in the first area, a stop element axially perforated and arranged so that said hydraulic valve abuts against the stop element when the hydraulic valve is connected to the hydro-booster device.

5. A device according to claim 1, wherein in the first area of said hydraulic valve, a further gasket is provided arranged to intercept a connection between the hydro-booster device and the hole communicating with the pre-filling channel, so as to provide a function of pressure modulation.

6. A hydraulic valve for a pre-filling device configured to operate in a braking system including a hydro-booster device, the hydraulic valve comprising:
   in a first area, a hole arranged to be connected to a pre-filling channel;
   a gasket arranged to connect the hole to the hydro-booster device, or disconnect said hole therefrom; and
   in a second area, hydraulically isolated from said first area and from the pre-filling channel, a preloaded resilient element housed, in use, in a chamber held at atmospheric pressure, and arranged to maintain the pre-filling pressure in the pre-filling channel by a reciprocating movement of the hydraulic valve inside the pre-filling channel, the reciprocating movement for ensuring that the gasket connects the hole to the hydro-booster device or disconnects the hole therefrom.

7. An operating method of a pre-filling device configured to operate in a braking system including a hydro-booster device arranged to generate a hydro-boost pressure, the pre-filling device including a pre-filling channel, a mechanical valve arranged to be mechanically opened, a hydraulic valve arranged to cooperate with the mechanical valve for setting a pre-filling pressure in the pre-filling channel, the hydraulic valve including, in a first area facing the mechanical valve, a hole communicating with the pre-filling channel, and, in a second area hydraulically isolated from the first area and opposite to the first area, a preloaded resilient element housed in a chamber held at atmospheric pressure, the method comprising hydraulically connecting and disconnecting the hydraulic valve, through the hole, to/from the hydro-booster device by a reciprocating movement of the hydraulic valve inside the pre-filling channel; and maintaining unchanged the pre-filling pressure in the pre-filling channel, upon variation of the hydro-boost pressure, by the reciprocating movement of the hydraulic valve depending on a difference between a pressure exerted by the preloaded resilient element and atmospheric pressure.

8. The method according to claim 6, wherein the step of hydraulically connecting the hydraulic valve to the hydro-booster device includes:

making the hydraulic valve abut against a stop element communicating with the pre-filling chamber, the stop element being provided in the first area.

9. The method according to claim 6, wherein the step of hydraulically disconnecting the hydraulic valve from the hydro-booster device includes:

intercepting, using a gasket provided in the hydraulic valve, a connection between the hydro-booster device, and the hole communicating with the pre-filling channel.

* * * * *